United States Patent
Ivanov

(10) Patent No.: US 11,855,908 B2
(45) Date of Patent: Dec. 26, 2023

(54) RESOURCE ALLOCATION IN CLOUD COMPUTING SYSTEMS

(71) Applicant: Microsoft Technology Licensing, LLC, Redmond, WA (US)

(72) Inventor: Andrei Ivanov, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/470,840

(22) Filed: Sep. 9, 2021

(65) Prior Publication Data
US 2023/0075114 A1 Mar. 9, 2023

(51) Int. Cl.
*H04L 47/78* (2022.01)
*H04L 47/70* (2022.01)
*H04L 47/762* (2022.01)

(52) U.S. Cl.
CPC .......... *H04L 47/781* (2013.01); *H04L 47/762* (2013.01); *H04L 47/822* (2013.01); *H04L 47/828* (2013.01)

(58) Field of Classification Search
CPC . H04L 61/4511; H04L 41/0893; H04L 45/24; H04L 47/20; H04L 69/326; H04L 41/0895; H04L 41/0894; H04L 67/02; H04L 45/308; H04L 47/2441; G06F 9/547
See application file for complete search history.

(56) References Cited

U.S. PATENT DOCUMENTS

| | | | | |
|---|---|---|---|---|
| 10,797,953 | B2 * | 10/2020 | Banerjee | H04L 41/0823 |
| 2003/0149631 | A1 * | 8/2003 | Crampton | G06Q 20/203 705/22 |
| 2007/0104101 | A1 * | 5/2007 | Sadr | H04L 41/0896 370/468 |
| 2008/0172673 | A1 * | 7/2008 | Naik | G06F 9/5072 718/104 |
| 2009/0083390 | A1 * | 3/2009 | Abu-Ghazaleh | H04L 67/10 709/209 |

(Continued)

OTHER PUBLICATIONS

"Maximum Bipartite Matching", Retrieved from: https://www.geeksforgeeks.org/maximum-bipartite-matching/, Retrieved Date: Jul. 7, 2020, 18 Pages.

(Continued)

*Primary Examiner* — Aftab N. Khan
(74) *Attorney, Agent, or Firm* — Ray Quinney & Nebeker; Tiffany Healy

(57) ABSTRACT

Computing systems, devices, and associated methods of allocating computing resources in a distributed computing system to user requests are disclosed herein. In one example, a method includes when none of unallocated computing resources satisfy a constraint on a physical attribute in a received request for the computing resource, identifying one of the allocated resources in the distributed computing system that satisfies the constraint on the physical attribute and recursively determining whether one of the other allocated or unallocated resources in the distributed computing system that satisfies a constraint of a prior request. In response to determining that none of the allocated or unallocated resources satisfies the constraint of the prior request, assignment of the identified one of the allocated resources to the prior request is maintained.

35 Claims, 7 Drawing Sheets

(56) References Cited

U.S. PATENT DOCUMENTS

| | | | | |
|---|---|---|---|---|
| 2010/0169489 | A1* | 7/2010 | Akiyama | G06Q 30/0645 |
| | | | | 705/40 |
| 2012/0191858 | A1* | 7/2012 | Madduri | G06F 9/5005 |
| | | | | 709/226 |
| 2017/0337091 | A1* | 11/2017 | Liu | H04L 67/12 |
| 2018/0115551 | A1* | 4/2018 | Cole | H04L 63/083 |
| 2020/0195524 | A1* | 6/2020 | Clow | H04L 41/5041 |

OTHER PUBLICATIONS

"Maximum Flow Problem", Retrieved from: https://en.wikipedia.org/wikiMaximum_flow_problem#Maximum_cardinality_bipartite_matching, Jun. 18, 2021, 13 Pages.

"International Search Report and Written Opinion Issued in PCT Application No. PCT/US22/037115", dated Oct. 12, 2022, 11 Pages.

Tan, et al., "Resource Stealing: A Resource Multiplexing Method for Mix Workloads in Cloud System", In the Journal of Supercomputing, vol. 75, Issue 1, Jan. 18, 2016, pp. 33-49.

\* cited by examiner

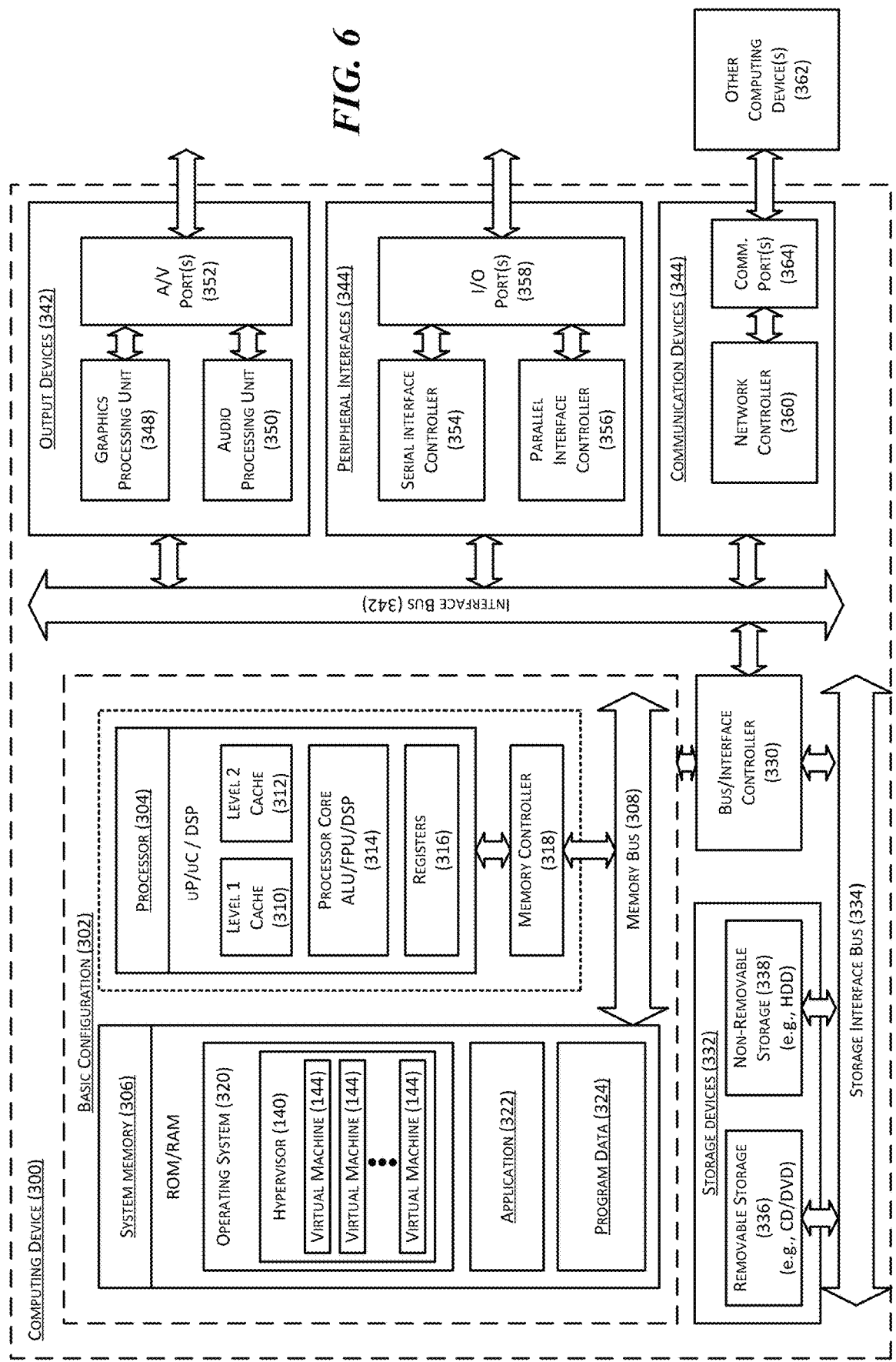

RESOURCE ALLOCATION IN CLOUD COMPUTING SYSTEMS

BACKGROUND

Datacenters and other distributed computing systems typically include routers, switches, bridges, load balancers, and other network devices that interconnect multiple servers, network storage devices, and other types of computing devices. The individual servers can host virtual machines, containers, virtual switches, or other types of virtualized functions. The virtual machines or containers in turn can execute applications to provide desired computing service from the distributed computing systems to users via a computer network such as the Internet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Distributed computing systems such as datacenters can include large numbers of servers, network devices, network storage devices, and other resources with different physical attributes. For example, servers can have central processing units (CPUs) with different numbers of cores operating at different frequencies. Servers can also have different sizes of memory, numbers and/or sizes of persistent storage devices (e.g., solid state devices), presence or absence of graphical processing units (GPUs), or other differences in physical components. Servers can also have different manufacturers, model numbers, and ages of being in operation. Servers can also have different physical attributes based on how/where the servers are installed. For instance, installation locations and/or configurations can cause servers to have different levels of backup power availability, network redundancy, cooling capacity, or other operating attributes. Such varieties of physical/operating attributes can cause allocating suitable resources to users cumbersome and inefficient.

In certain computing systems, users can specify desired resources based on stock keeping units (SKUs) that individually define physical attributes of resources. For example, a SKU can be assigned to a server with ten cores operating at 1 GHz with 256 GB of random access memory (RAM). In other computing systems, users can also specify desired resources based on SKU groups each defining resources with similar physical attributes. However, users sometimes may not even know available SKUs or SKU groups. Even when available SKUs are visible, sifting through all available SKUs can be time consuming and confusing. If no user input is received for the desired resources, matching requests with resources by simple permutations in datacenters can be impractical. Currently, datacenters can each include thousands or even millions of servers and other computing components. Finding a best match by simple permutations of resources and requests can have non-deterministic polynomial (NP) complexity, and thus is practically impossible.

Several embodiments of the disclosed technology can address certain aspects of the foregoing drawbacks by applying Bipartite Graph matching between resources and requests in a distributed computing system to achieve efficient allocation of resources to requests by users. In certain implementations, both requests and resources can be enumerated into respective lists in a Bipartite Graph according to physical attributes. For example, users can request some number of servers with desired constraints on physical attributes, such as number of cores, operating frequency, etc. Each constraint of physical attributes can accept more than one value or a value range. As such, a request can contain [0-N] constraints of physical attributes. A single request can be satisfied with resources having different physical attributes. For example, a request for {{Datacenter: DC1, DC2}, {Power: dual}, {Cores: >=40}}, can be satisfied with any dual powered server in datacenters DC1 or DC2 and with any number of cores greater or equal than 40.

Upon receiving one or more requests from users, a resource allocator can be configured to enumerate the received requests and any existing requests into a request list. The resource allocator can also enumerate resources, both allocated and unallocated resources in the distributed computing system into a resource list. The request list and the resource list can then be constructed into a Bipartite Graph. A Bipartite Graph is a graph whose vertices (or endpoints) are divided into two disjoint and independent lists U and V such that an edge connects a vertex in U to one in V in the Bipartite Graph. For example, each request with corresponding constraints can form a vertex in U while each resource with corresponding physical attributes forms a vertex in V. In certain embodiments, the resource allocator can then be configured to match the independent sets U and V such that a maximum number of requests from U are matched to corresponding resources with physical attributes that satisfy the constraints of the corresponding requests in V. In other embodiments, the resource allocator can also match the sets U and V based on other suitable criteria.

A matching in a Bipartite Graph can be represented by a set of edges chosen in such a way that no two edges share a vertex in U or V. For examples, a maximum matching is a matching of a maximum size (e.g., a maximum number of edges) in a Bipartite Graph that uses as many edges as possible. In a maximum matching, if an edge is added to the Bipartite Graph, there is no longer a matching in the Bipartite Graph. There can be more than one maximum matchings for a Bipartite Graph. In other examples, a Bipartite Graph can be matched via maximum weight matching, stable marriage, or other suitable types. In accordance with embodiments of the disclosed technology, the request and resource sets U and V can be matched by implementing one or more recursive eviction operations, as described in more detail below.

Upon constructing the Bipartite Graph of requests and resources, the resource allocator can be configured to determine whether an unallocated resource satisfies an incoming request, for example, in a sequential manner. In response to determining that an unallocated resource is found in the resource set, the resource allocator can be configured to allocate or assign the resource to the request and mark the assigned resource as being allocated. On the other hand, in response to determining that a resource is not found in the resource set, the resource allocator can be configured to then recursively determine whether a prior request with an allocated resource can be reassigned or "evicted" to some other resources in the distributed computing system and allocate the previously allocated resource to the incoming request. For example, to assign a resource to a request $U_A$, the resource allocator can attempt to evict a resource $V_B$ previously assigned to a prior request $U_B$ from $U_B$ and reassign $V_B$ to $U_A$. To allocate for the prior request $U_B$, the resource allocator can attempt to reassign yet another resource $V_C$ previously assigned to a request $U_C$ to $U_B$. The foregoing operations can be repeated until a resolution is found or no more resources are available for eviction.

The foregoing recursive eviction can sometimes lead to large numbers or even endless cyclical evictions of resources from requests. To reduce the number of recursions, the resource allocator can be configured to ignore resources previously assigned to requests in the recursive chain. For instance, in the example above, when the resource allocator is searching for a new resource for evicted prior request $U_C$, the resource allocator is configured to not consider resources previously assigned to either request $U_A$ or $U_B$. As such, each time the resource allocator proceeds into a new recursion, for instance, from $U_B$ to $U_C$, the resource allocator can mark the resource of the previous recursion, i.e., a resource $V_B$ previously assigned to $U_B$ as, for example, SEEN. For the new recursion for $U_C$, the resource allocator can be configured to skip any resources marked as SEEN.

Upon completion of the recursion chain, all resources marked as SEEN can be cleared for a next recursion chain, such as for allocating to a new incoming request $U_D$. During the recursion chain, if the resource allocator identifies a request, e.g., $U_C$, that can be reassigned to a new resource (e.g., $V_D$) without evicting any other already assigned requests, the resource allocator can proceed to reassign the request (e.g., $U_C$) to the new resource $V_D$ while $U_A$ is assigned with $V_B$ and $U_B$ is assigned with $V_C$. On the other hand, if the resource allocator does not identify an UNSEEN resource that can be assigned to $U_C$, the resource allocator can be configured to maintain current assignments of resources, e.g., $V_B$ to $U_B$ and $V_C$ to $U_C$ and leave the incoming request in the recursion chain, e.g., $U_A$, unassigned.

In accordance with additional aspects of the disclosed technology, to further reduce the number of iterations in the foregoing recursive eviction, the resource allocator can also be configured to ignore reassignment of an existing request when the set of acceptable physical attributes of resources to an allocated request is a subset of the acceptable resources for an unallocated request. For example, if an existing request $U_B$ has a constraint of {Cores: >50} and the new request $U_A$ has a constraint of {Cores: >40}, the resource allocator can be configured to skip reassigning $U_B$ because if a server with more than 40 cores cannot be found for $U_A$, the resource allocator would not be able to find one with more than 50 cores for $U_B$. As such, by skipping reassignment of request $U_B$, the number of iterations in the recursive chain can be significantly reduced.

In certain embodiments, the resource allocator can be configured to perform the foregoing recursive assignment each time a new request is received. However, such recursive assignment is non-trivial in nature. Thus, large amounts of compute and other types of resources may be spent to perform the recursive assignment. In accordance with additional aspects of the disclosed technology, the resource allocator can be configured to pre-calculate the non-trivial assignment of resources to requests into a two-dimensional array based on "typical" requests and resources. Thus, upon receiving a new request, a resource can be identified from the two-dimensional array using the request and corresponding constraints of physical attributes as keys.

The inventor has recognized that the number of combinations of physical attributes of resources is typically much smaller than the number of resources. For example, servers in a datacenter can be the same model and configurations from a single manufacturer. When the servers are installed in the datacenter, the servers can be installed in a limited number of ways or even in the same way. Thus, a datacenter with one hundred thousand computers usually has less than ten different combinations of physical attributes of servers. Also, the number of different combinations of constraints in requests is typically much smaller than the number of resources requested. For example, a request can involve hundreds or even thousands of servers with the same physical attributes of servers. In another example, certain users are only allowed to request predefined sets of physical attributes but not any combination of parameters due to contractual, legal, or other reasons. As such, by enumerating such "typical" resources and requests, the resource allocator can be configured to pre-calculate the two-dimension array of resource to request mapping.

Several embodiments of the disclosed technology can efficiently match user requests for resources with available resources in a distributed computing system. By applying Bipartite Graph matching to the requests and resources, resources with different sets of physical attributes can be efficiently and suitably assigned to requests with different constraints of such physical attributes. During matching, the resource allocator can apply various techniques to efficiently identify an assignment solution. For example, resources assigned to requests in previous iterations of a recursive chain for reassignment can be ignored. In another example, reassignment of an existing request can be skipped when the set of acceptable resources to the existing request is a subset of the acceptable resources for a new request. In a further example, the resource allocator can be configured to pre-calculate assignments based on "typical" resources present in the distributed computing system and "typical" requests from users. As such, when a new request is received, the resource allocator can readily determine assignment of a resource to the new request using the pre-calculated assignments.

BRIEF DESCRIPTION OF THE DRAWINGS

FIG. 6 is a computing device suitable for certain components of the distributed computing system in FIG. 1.

DETAILED DESCRIPTION

Figure 1:
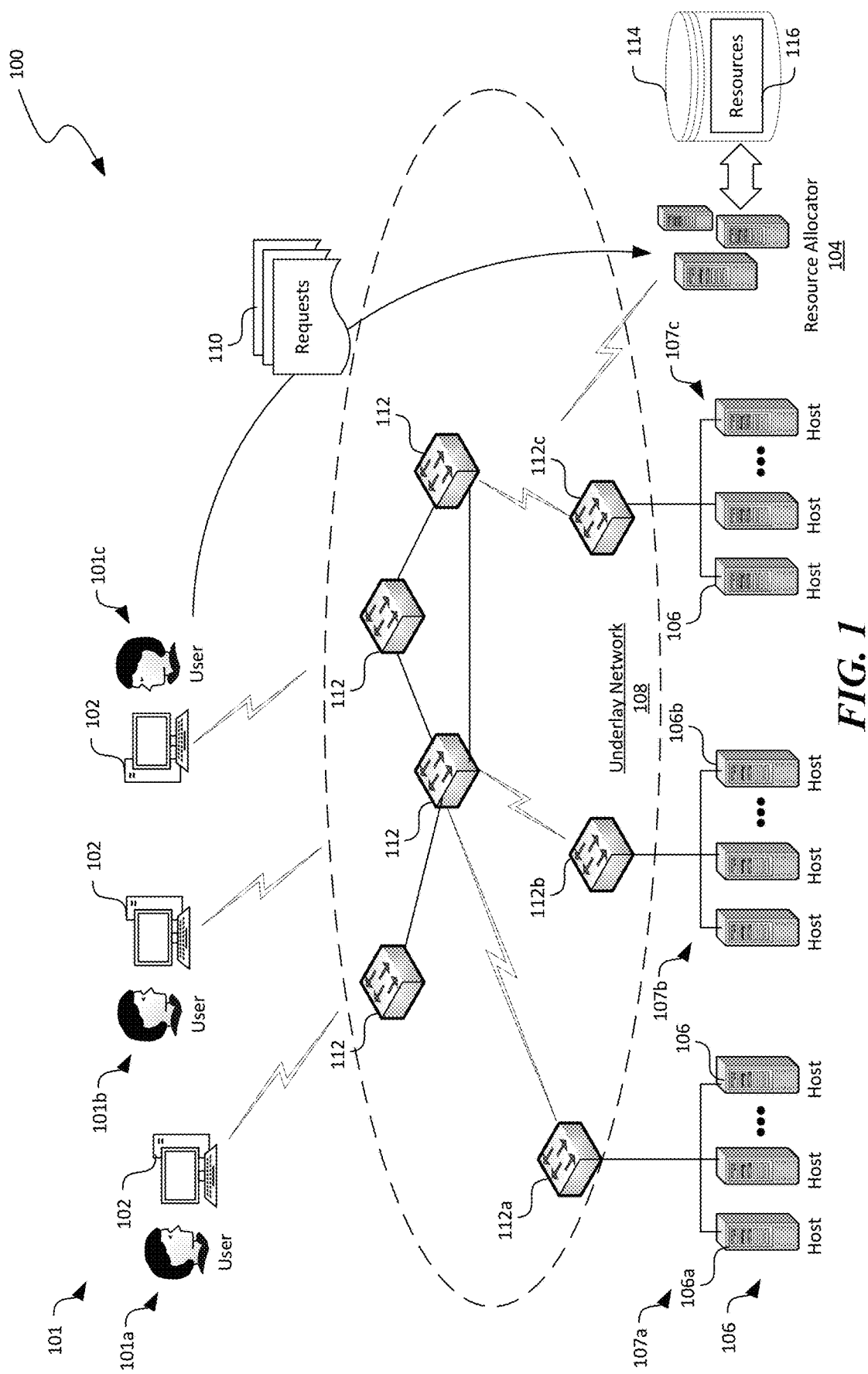
FIG. 1 is a schematic diagram illustrating a distributed computing system implementing resource allocation in accordance with embodiments of the disclosed technology.

Certain embodiments of systems, devices, components, modules, routines, data structures, and processes for resource allocation in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "distributed computing system" generally refers to an interconnected computer network having a plurality of network nodes that connect a plurality of servers or hosts to one another or to external networks (e.g., the Internet). The term "network node" generally refers to a physical or virtual network device. Example network nodes include routers, switches, hubs, bridges, load balancers, security gateways, or firewalls. A "host" generally refers to a physical computing device configured to implement, for instance, one or more virtual machines, containers, virtual switches, or other suitable virtualized components. For example, a host can include a server having a hypervisor configured to support one or more virtual machines, virtual switches, or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines configured to execute one or more user applications. The virtual networks can interconnect multiple TEPs on different hosts. Virtual network nodes in the overlay network can be connected to one another by virtual links individually corresponding to one or more network routes along one or more physical network nodes in the underlay network.

As used herein, the term "resource" or "computing resource" generally refers to any physical or virtual component of limited availability within a distributed computing system such as a datacenter. Example computing resources can include processor capacities (e.g., CPUs or cores), network capacities (e.g., network connections and network bandwidth), and computer readable storage capacities (e.g., memory blocks in solid state devices). Executing an application in a distributed computing system can consume various amount and types of computing resources. For example, executing an application for voice-over-IP conference can consume a certain amount of compute, storage, and network resources. In another example, executing an application of database management can consume a certain amount of processor and storage resources.

As used herein, a "computing service" generally refers to computing resources provided to users over a computer network such as the Internet. Common examples of computing services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, a "request" for resources generally refers to a data structure having data representing a request for computing resources or services provided in a distributed computing system via a computer network. For example, a request can be for execution of an application in a virtual machine on a server in the distributed computing system. In another example, a request can be for storing, modifying, deleting, or other suitable operations on one or more database records contained in one or more storage devices in the distributed computing system.

In certain embodiments, a request can include data specifying a constraint on physical attributes of requested computing attributes. For example, a user can request a server for executing a virtual machine with desired constraints on number of cores, operating frequency, etc. Each constraint of physical attributes can accept more than one value or a value range. As such, a request can contain [0-N] constraints of physical attributes. A single request can be satisfied with resources having different physical attributes. For example, a request for {{Datacenter: DC1, DC2}, {Power: dual}, {Cores: >=40}}, can be satisfied with any dual powered server in datacenters DC1 or DC2 and with any number of cores greater or equal than 40.

Physical attributes of a computing resource can include configuration, manufacturing, installation, specification, or other suitable types of features of the computing resources. For example, servers can have central processing units (CPUs) with different numbers of cores operating at different frequencies. Servers can also have different sizes of memory, numbers and/or sizes of persistent storage devices (e.g., solid state devices), presence or absence of graphical processing units (GPUs), or other differences in physical components. Servers can also have different manufacturers, model numbers, and ages of being in operation. Servers can further have physical attributes based on how/where the servers are installed. For instance, installation locations and/or configurations can cause servers to have different levels of backup power availability, network redundancy, cooling capacity, or other operating attributes.

Allocation of resources to requests generally refers to assigning computing resources to serve corresponding requests and provide suitable computing services to a user of the request. In certain embodiments, a computing resource can be assigned to only one request. In other embodiments, a computing resource can be virtualized and shared among multiple requests. For ease of description herein, a computing resource that is assigned to request is referred to as allocated while another computing resource that has not been assigned to any request is referred to as unallocated. Deallocation of an assigned resource from a corresponding request can be generally referred to evicting the request from the assigned resource.

In certain computing systems, users are relied upon for specifying physical attributes of requested computing resources based on, for instance, SKUs, model numbers, or other suitable identifiers. However, users sometimes may not even know available SKUs or SKU groups. Even when available SKUs are visible, sifting through all available SKUs can be time consuming and confusing. If no user input is received for the desired resources, matching requests with resources by simple permutations in datacenters can be impractical. Currently, datacenters can each include thousands or even millions of servers and other computing components. Finding a best match by simple permutations of resources and requests can have non-deterministic polynomial (NP) complexity, and thus is practically impossible.

Several embodiments of the disclosed technology can address certain aspects of the foregoing drawbacks by applying bipartite matching between resources and requests in a distributed computing system to achieve efficient allocation of resources to requests. In certain implementations, both requests and resources can be enumerated into respective lists in a Bipartite Graph. For a request in the Bipartite Graph, if an unallocated resource satisfies a constraint of physical attributes of the request, the unallocated resource is assigned to serve the request. However, if no unallocated resources satisfy the constraint, a recursive determination can be performed to determine whether one or more of the allocated requests can be evicted from corresponding resources that can serve the current request, and whether one or more of the other allocated or unallocated resources can be assigned to serve the evicted request. By applying Bipartite Graph matching to the requests and resources, resources with different sets of physical attributes can be efficiently and suitably assigned to requests with different constraints of such physical attributes, as described in more detail below with reference to FIGS. 1-6.

FIG. 1 is a schematic diagram illustrating a distributed computing system 100 implementing resource allocation in accordance with embodiments of the disclosed technology. As shown in FIG. 1, the distributed computing system 100 can include an underlay network 108 interconnecting a plurality of hosts 106, a plurality of client devices 102 associated with corresponding users 101, and a resource allocator 104 operatively coupled to one another. Even though particular components of the distributed computing system 100 are shown in FIG. 1, in other embodiments, the distributed computing system 100 can also include additional and/or different components or arrangements. For example, in certain embodiments, the distributed computing system 100 can also include network storage devices, additional hosts, and/or other suitable components (not shown).

As shown in FIG. 1, the underlay network 108 can include one or more network nodes 112 that interconnect the multiple hosts 106 and the client devices 102 of the users 101. In certain embodiments, the hosts 106 can be organized into racks, action zones, groups, sets, or other suitable divisions. For example, as illustrated in FIG. 1, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topologies. The underlay network 108 can allow communications between hosts 106, the resource allocator 104, and the client devices 102 of the users 101. In other embodiments, the multiple host sets 107a-107c may share a single network node 112 or can have other suitable arrangements.

The hosts 106 can individually be configured to execute virtual machines 144 (shown in FIG. 2), containers (not shown), or user applications 147 (shown in FIG. 2) to provide computing, storage, and/or other cloud or other suitable types of computing services to the users 101. For example, as described in more detail below with reference to FIG. 2, one of the hosts 106 can initiate and maintain one or more virtual machines 144 upon requests from the users 101. The users 101 can then utilize the initiated virtual machines 144 to execute user applications 147 to perform computation, communication, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates corresponding users 101 to access computing services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The resource allocator 104 can be configured to allocate computing resources in the distributed computing system 100 to requests from the users 101. As shown in FIG. 1, the resource allocator 104 can be configured to receive requests 110 from the users 101 and operatively coupled to a network storage 114 containing database records of resources 116 of allocated and unallocated resources in the distributed computing system 100. Each request 110 can include data representing one or more constraints on one or more physical attributes of computing resources requested by the users 101. Each of the database records of resources 116 can include data representing values of physical attributes of a corresponding computing resource in the distributed computing system 100 and a status of assignment, e.g., whether the computing resource is assigned and if already assigned, to which request 110. In other embodiments, the requests 110 and the database records of resources 116 can also include additional data representing, for instance, a subscription level of the users 101, a health status of the computing resources, or other suitable information. Though FIG. 1 shows that the user 101 issues the request 110, in other implementations, the request 110 may be issued by a host 106, a computing service hosted on a host 106 (e.g., a virtual machine, a container, or an application), or other suitable hardware/software entities.

As described in more detail herein, the resource allocator 104 can be configured to determine a mapping of resources 116 to requests 110 from the users 101 via Bipartite Graph matching. In certain implementations, resources in the distributed computing system 100 can be matched and assigned to serve a maximum number of requests 110 from the users 101. In other implementations, resources in the distributed computing system 100 can also be matched and assigned to serve a threshold number lower than the maximum number of requests 110. Example components suitable for the resource allocator 104 are described in more detail below with reference to FIG. 3 while example matching operations of the resource allocator 104 are described in more detail below with reference to FIGS. 4A-4D.

Figure 2:
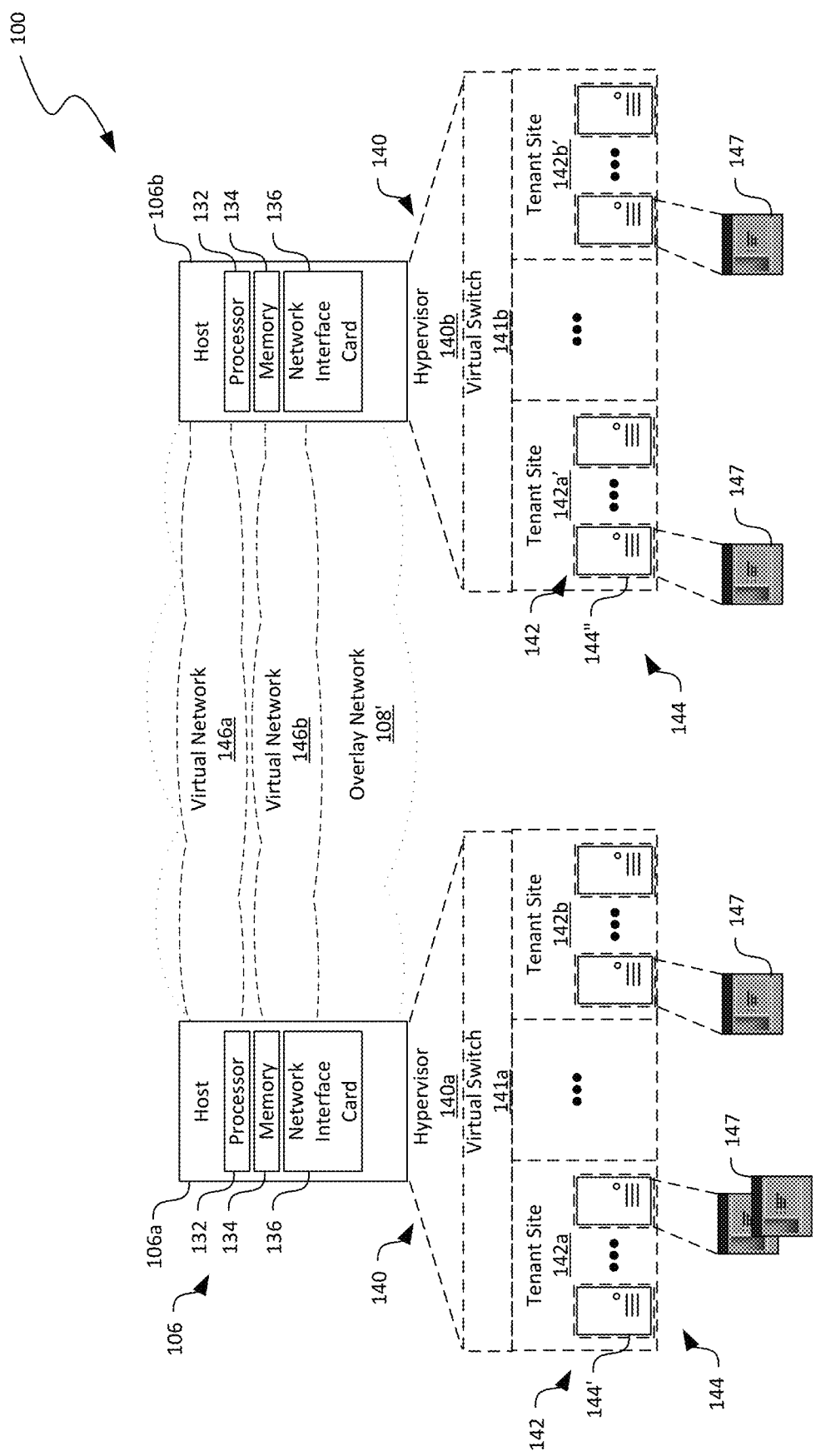
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. Specifically, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the distributed computing system 100 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and a network interface card 136 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A and 4B). The network interface card 136 can include a network adapter, a LAN adapter, physical network interface, or other suitable types of hardware component that connects a host 106 to the underlay network 108 (FIG. 1). In other embodiments, the hosts 106 can also include input/output devices configured to accept input from and provide output to an operator and/or an automated software controller (not shown), or other suitable types of hardware components.

The first and second hosts 106a and 106b can individually contain instructions in the memory 134 executable by the processors 132 to cause the individual processors 132 to provide a hypervisor 140 (identified individually as first and second hypervisors 140a and 140b) and a virtual switch 141 (identified individually as first and second virtual switches 141a and 141b). Even though the hypervisor 140 and the virtual switch 141 are shown as separate components, in other embodiments, the virtual switch 141 can be a part of the hypervisor 140 (e.g., operating on top of an extensible switch of the hypervisors 140), an operating system (not shown) executing on the hosts 106, or a firmware component of the hosts 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first user 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more user applications 147 to provide suitable compute or other types of computing resources as computing services to the users 101 (FIG. 1) via the overlay network 108' and the underlay network 108 (FIG. 1). The user applications 147 and the virtual machines 144 on the virtual networks 146 can also communicate with one another via the overlay network 108' and the underlay network 108 even though the virtual machines 144 are located on different hosts 106. Communications of each of the virtual networks 146 can be isolated from other virtual networks 146. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

Figure 3:
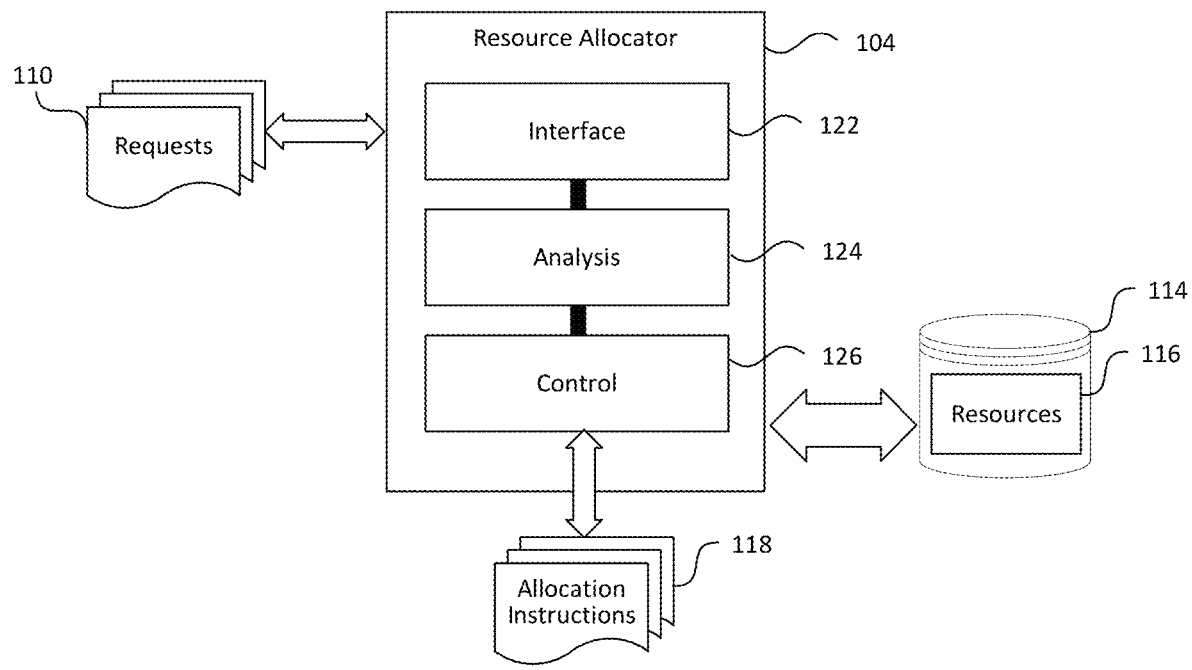
FIG. 3 is a schematic diagram illustrating certain hardware/software components of a resource allocator suitable for the distributed computing system of FIG. 1 in accordance with embodiments of the disclosed technology.

FIG. 3 is a schematic diagram illustrating certain hardware/software components of a resource allocator 104 suitable for the distributed computing system 100 of FIG. 1 in accordance with embodiments of the disclosed technology. As shown in FIG. 3, the resource allocator 104 can include an interface component 122, an analysis component 124, and a control component 126 operatively coupled to one another. Though particular components of the resource allocator 104 are shown in FIG. 3, in other embodiments, the resource allocator 104 can also include network, database, or other suitable types of component(s).

The interface component 122 can be configured to receive requests 110 from the users 101 (FIG. 1). In certain embodiments, the interface component 122 can be configured to receive the requests 110 from the users 101 in real time or virtually real time. In other embodiments, the interface component 122 can be configured to receive a set of "typical" requests 110. The inventor has recognized that the number of different combinations of constraints in requests 110 is typically much smaller than the number of resources requested. For example, a request 110 can involve hundreds or even thousands of servers with the same physical attributes of servers. In another example, certain users 101 are only allowed to request predefined sets of physical attributes but not any combination of parameters due to contractual, legal, or other reasons. As such, by enumerating such "typical" requests, the resource allocator 104 can be configured to pre-calculate the two-dimension array of resource to request mapping.

In addition, the number of combinations of physical attributes of resources is typically much smaller than the number of resources. For example, servers in a datacenter can be the same model and configurations from a single manufacturer. When the servers are installed in the datacenter, the servers can be installed in a limited number of ways or even in the same way. Thus, a datacenter with one hundred thousand computers usually has less than ten different combinations of physical attributes of servers. Though the operations described below are in the context of real time requests 110, similar matching operations can also be performed based on such "typical" requests and "typical" resources.

Upon receiving the requests 110, the interface component 122 can be configured to verify identity of a user 101 submitted the request 101, a subscription level of the user 101, an integrity of the request 110, and/or other suitable information of the requests 110 before forwarding the requests 110 to the analysis component 124 for further processing. The analysis component 124 can be configured to perform Bipartite Graph matching based on the received requests 110 and the database records of resources 116 in the network storage 114.

In certain implementations, both the requests 110 and the resources 116 in the database records can be enumerated into respective lists in a Bipartite Graph 130 (shown in FIGS. 4A-4D). For a request 110 in the Bipartite Graph 130, if an unallocated resource 116 satisfies a constraint of physical attributes of the request, the unallocated resource 116 is assigned to serve the request 110. However, if no unallocated resources 116 satisfy the constraint, a recursive determination can be performed to determine whether one or more of requests 110 can be evicted from corresponding allocated resources 116 that can serve the current request 110, and whether one or more of the other allocated or unallocated resources 116 can be assigned to serve the evicted request 110. By applying Bipartite Graph matching to the requests 110 and resources 116, resources 116 with different sets of physical attributes can be efficiently and suitably assigned to the requests 110 with different constraints of such physical attributes. Example matching operations suitable for performance by the analysis component 124 are described below in more detail with reference to FIGS. 4A-4D.

The control component 126 can be configured to implement resource allocation based on analysis results from the analysis component 124. In certain embodiments, the control component 126 can be configured to issue allocation instructions 118 to assign an unallocated resource 116 to a request 110. In other embodiments, the control component 126 can also be configured to reassign allocated resources 116 to one or more requests 110 and assign an unallocated resource 116 to an evicted or new request 110. In further embodiments, the control component 126 can be configured to perform other suitable operations.

Figure 4A:
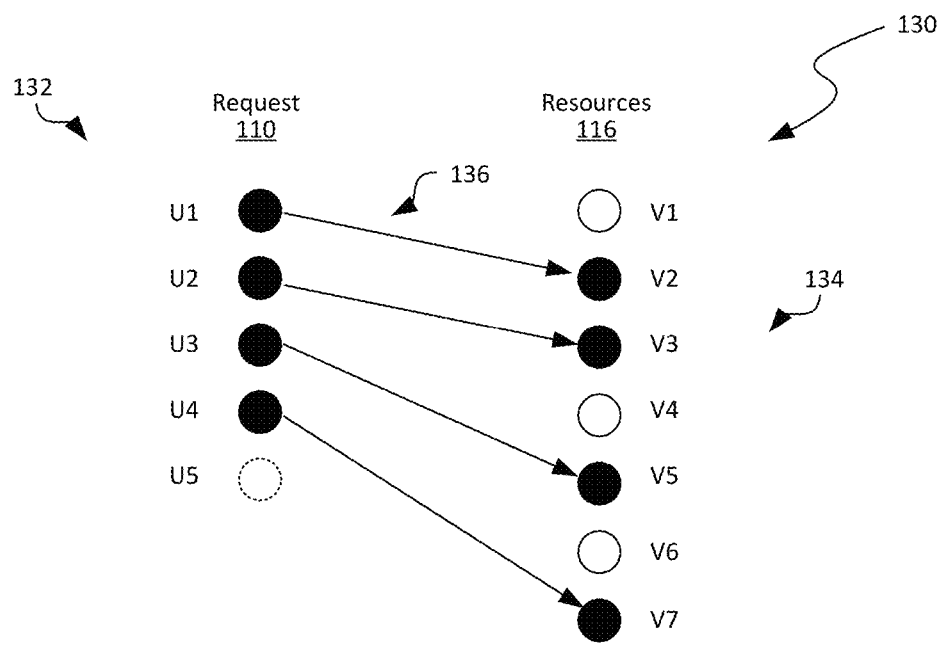
FIGS. 4A-4D are schematic diagram of Bipartite Graphs illustrating example operations of resource allocation in accordance with embodiments of the disclosed technology.

FIGS. 4A-4D are schematic diagram of Bipartite Graphs 130 illustrating example operations of resource allocation in accordance with embodiments of the disclosed technology. As shown in FIG. 4A, the Bipartite Graph 130 includes a request list 132 and a resource list 134. In the illustrated example, the request list 132 includes five requests 110 labeled U1 to U5 while the resource list 134 includes seven resources 116 labeled V1-V7 for illustration purposes. In other examples, the request list 132 and/or the resource lists 134 can include any suitable numbers of requests 110 or resources 116, respectively. For ease of description, it is assumed that none of the requests 110 have been initially assigned a corresponding resource 116, and none of the resources 116 have been initially allocated to corresponding requests 110.

In certain implementations, the analysis component 124 (FIG. 3) can be configured to enumerate both requests 110 and resources 116 (both allocated and unallocated) into respective request and resource lists 132 and 134 in the Bipartite Graph 130, respectively. The analysis component 124 can be configured to enumerate the requests 110 and/or resources 116 upon receiving one or more of the requests 110 or at a periodic interval. A request 110 can include one or more constraints on the physical attributes of resources 116. For example, a user 101 (FIG. 1) can request some number of servers with desired constraints on number of cores, operating frequency, etc. Each constraint of physical attributes can accept more than one value or a value range. As such, a request 110 can contain [0-N] constraints of physical attributes. A single request 110 can be satisfied with resources 116 having different physical attributes. For example, a request for {{Datacenter: DC1, DC2}, {Power: dual}, {Cores: >=40}}, can be satisfied with any dual powered server in datacenters DC1 or DC2 and with any number of cores greater or equal than 40.

As shown in FIG. 4A, the Bipartite Graph 130 is a graph whose vertices (or endpoints) are divided into two disjoint and independent sets U and V such that an edge 136 connects a vertex in U to one in V in the Bipartite Graph 130. For example, each request 110 with corresponding constraints can form a vertex in U (e.g., U1-U5) while each resource 116 with corresponding physical attributes forms a vertex in V (e.g., V1-V7). In certain embodiments, the analysis component 124 can then be configured to match the independent sets U and V such that a number of requests 110 from U are matched to corresponding resources 116 with physical attributes that satisfy the constraints of the requests 110 in V.

A matching in the Bipartite Graph 130 is a set of edges 136 chosen in such a way that no two edges 136 share a vertex in U or V. For examples, a maximum matching is a matching of a maximum size (e.g., a maximum number of edges) in the Bipartite Graph 130 that uses as many edges 136 as possible. In a maximum matching, if an edge 136 is added to the Bipartite Graph 130, there is no longer a matching in the Bipartite Graph 130. There can be more than one maximum matchings for a Bipartite Graph 130. In other examples, the Bipartite Graph 130 can be matched via maximum weight matching, stable marriage, or other suitable types.

Upon constructing the Bipartite Graph 130, the analysis component 124 can be configured to determine whether an unallocated resource 116 in the resource list 134 satisfies a request 110 in the request list 132 in a sequential manner. In response to determining that an unallocated resource 116 is found in the resource list 134, the analysis component 124 can be configured to allocate or assign the resource 116 to the request 110 and mark the assigned resource 116 as being allocated. For instance, as shown in FIG. 4A, the analysis component 124 can determine that unallocated resource V1 does not satisfy the constraints of request U2. Thus, the analysis component 124 skips over resource V1 and examine resource V2. In response to determine that resource V2 satisfies the constraint of request U1, the analysis component 124 can assign resource V2 to request U2 and mark the resource V2 as being allocated to request U2, as indicated by the solid circle. The analysis component 124 can then perform similar matching operations for requests U2-U4 and assign unallocated resources V3, V5, and V7 to the requests U2-U4, respectively.

Figure 4B:
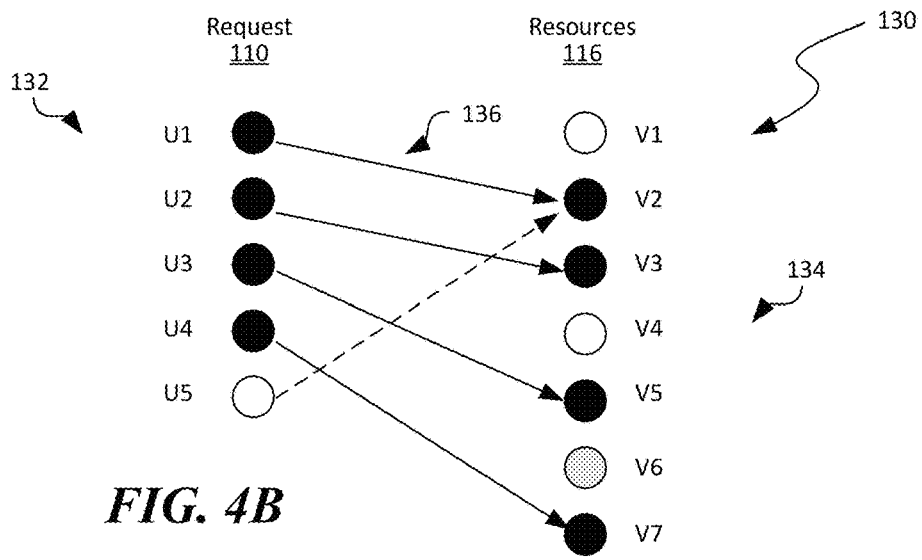

On the other hand, in response to determining that a resource 116 is not found in the resource list 134 that satisfies constraints of a request 110, e.g., request U5, the analysis component 124 can be configured to then recursively determine whether a request 110 with an allocated resource 116 can be reassigned to some other resources 116 in the distributed computing system 100 and allocate the previously allocated resource 116 to the current request 110. For example, as shown in FIG. 4A, none of unallocated resources V1, V4, and V6 can satisfy the constraint of the request U5. Instead, as shown in FIG. 4B, the analysis component 124 can determine that resource V2 satisfies the constraint of request U5. The resource V2, however, has been previously assigned to request 110.

Figure 4C:
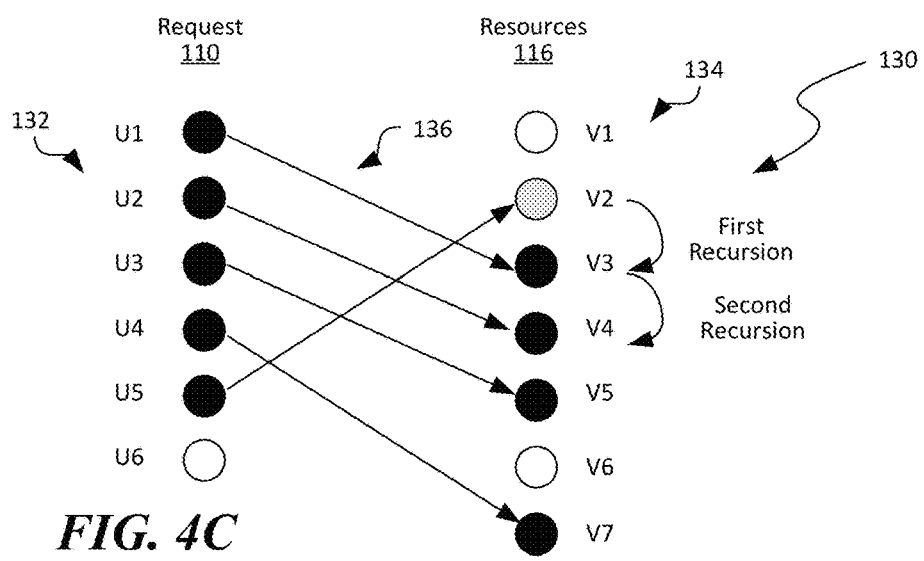

Upon determining that resource V2 satisfies the constraint of request U5, the analysis component 124 can be configured to tentatively assign resource V2 to request U5 and recursively determine whether some other allocated or unallocated resources 116 can satisfy the constraint of request U1. As shown in FIG. 4C, the analysis component 124 can then determine that resource V3, which is currently assigned to request U2 satisfies the constraint of request U1 and tentatively assign resource V3 to request U1. The foregoing operation is a first recursion. The analysis component 124 can then be configured to perform a second recursion to determine whether some other allocated or unallocated resource 116 can satisfy the constraint of request U2. In the illustrated example, the analysis component 124 can determine that unallocated resource V4 satisfies the constraint of request U2. Upon identifying resource V4 satisfying the constrain the request U2, the analysis component 124 can instruct the control component 126 (FIG. 3) to reassign the resources 116 to the requests 110 as shown in FIG. 4C. As such, resource V2 is assigned to request U5; resource V3 is assigned to request U1; resource V4 is assigned to request U2. Though only two recursions are shown in FIG. 4C for illustration purposes, in other implementations, the analysis component 124 can be configured to perform one, three, four, five, or any other suitable numbers of recursions.

The foregoing recursive operations can sometimes lead to large numbers or even endless cyclical evictions of resources 116 from requests 110. For example, when determining whether any resources 116 satisfy the constraint of U2, the analysis component 124 may also examine resource V3 which was previously assigned to request U2. To reduce the number of recursions, the analysis component 124 can be configured to ignore resources 116 previously assigned to requests 110 in the recursive chain. For instance, in the example above, when the analysis component 124 is searching for a new resource for evicted request U2, the analysis component 124 is configured to not consider resources 116 previously assigned to either request U1 or U2, e.g., V2 and V3. As such, each time the analysis component 124 proceeds into a new recursion, for instance, from U1 to U2, the analysis component 124 can mark the resource 116 of the previous recursion, i.e., a resource V3 previously assigned to U2 as, for example, SEEN. For the new recursion for U2, the analysis component 124 can be configured to skip any resources 116 marked as SEEN.

Figure 4D:
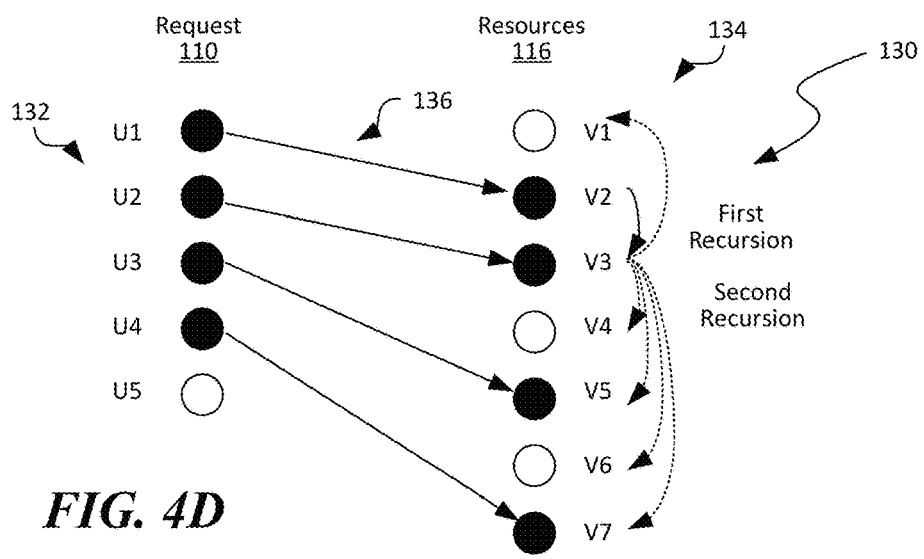

Upon completion of the recursion chain, all resources 116 marked as SEEN can be cleared for a next recursion chain, such as for allocating to a new incoming request U6 shown in FIG. 4C. During the recursion chain, if the analysis component 124 identifies a request 110, e.g., U2, that can be reassigned to a new resource (e.g., V4) without evicting any other already assigned requests 110, the analysis component 124 can be configured to reassign the request 110 (e.g., U2) to the new resource V4. On the other hand, if the analysis component 124 does not identify an un-SEEN resource 110 that can be assigned to U2, the analysis component 124 can be configured to maintain current assignments of resources and leave the current request in the recursion chain, e.g., U5, unassigned. For instance, as shown in FIG. 4D, during the second recursion, the analysis component 124 can determine that none of resources V1, V4, V5, V6, or V7 satisfies the constraint of request U2 (shown in dashed lines). As such, the analysis component 124 can be configured to instruct the control component 126 to maintain and not reassign the mapping of resources 116 and requests 110, as shown in FIG. 4A.

In accordance with additional aspects of the disclosed technology, to further reduce the number of iterations in the foregoing recursive operations, the analysis component 124 can also be configured to ignore reassignment of an existing request 110 when the set of acceptable physical attributes of resources 116 to an allocated request 110 is a subset of the acceptable resources for an unallocated request 110. For example, if the request U3 has a constraint of {Cores: >50} and the request U2 has a constraint of {Cores: >40}, the analysis component 124 can be configured to skip reassigning U3 because if a server with more than 40 cores cannot be found for U2, the analysis component 124 would not be able to find one with more than 50 cores for U3. As such, by skipping reassignment of request U3, the number of iterations in the recursive chain can be significantly reduced.

In certain embodiments, the resource allocator 104 (FIG. 3) can be configured to perform the foregoing recursive assignment each time a new request 110 is received, e.g., request U6 in FIG. 4C. However, such recursive assignment is non-trivial in nature. Thus, large amounts of compute and other types of resources 116 may be spent to perform the recursive assignment. In accordance with additional aspects of the disclosed technology, the resource allocator 104 can be configured to pre-calculate the non-trivial assignment of resources 116 to requests 110 into a two-dimensional array based on "typical" requests 110 and resources 116. Thus, upon receiving a new request 110, e.g., request U6, a resource 116 can be identified from the two-dimensional array using the request 110 and corresponding constraints of physical attributes as keys.

Several embodiments of the disclosed technology can efficiently match user requests 110 for resources 116 with available resources 116 in the distributed computing system 110. By applying Bipartite Graph matching to the requests 110 and resources 116, resources 116 with different sets of physical attributes can be efficiently and suitably assigned to requests 110 with different constraints of such physical attributes. During matching, the resource allocator 104 can apply various techniques to efficiently identify an assignment solution. For example, resources 116 assigned to requests 110 in previous iterations of a recursive chain for reassignment can be skipped. In another example, reassignment of an existing request 110 can be skipped when the set of acceptable resources 116 to the existing request 110 is a subset of the acceptable resources 116 for a new request 110. In a further example, the resource allocator 104 can be configured to pre-calculate assignments based on "typical" resources 116 present in the distributed computing system and "typical" requests 110 from users 101. As such, when a new request 110 is received, the resource allocator 104 can readily determine assignment of a resource 116 to the new request 110 using the pre-calculated assignments.

Figure 5A:
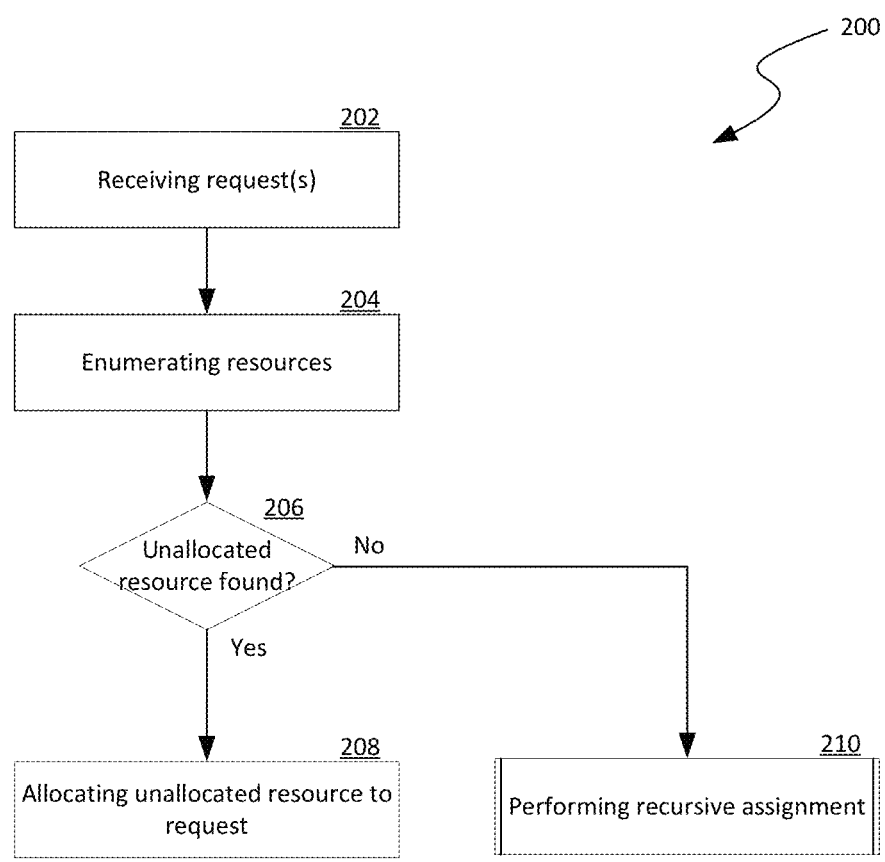
FIGS. 5A and 5B are flowcharts illustrating processes of resource allocation in accordance with embodiments of the disclosed technology.
Figure 5B:
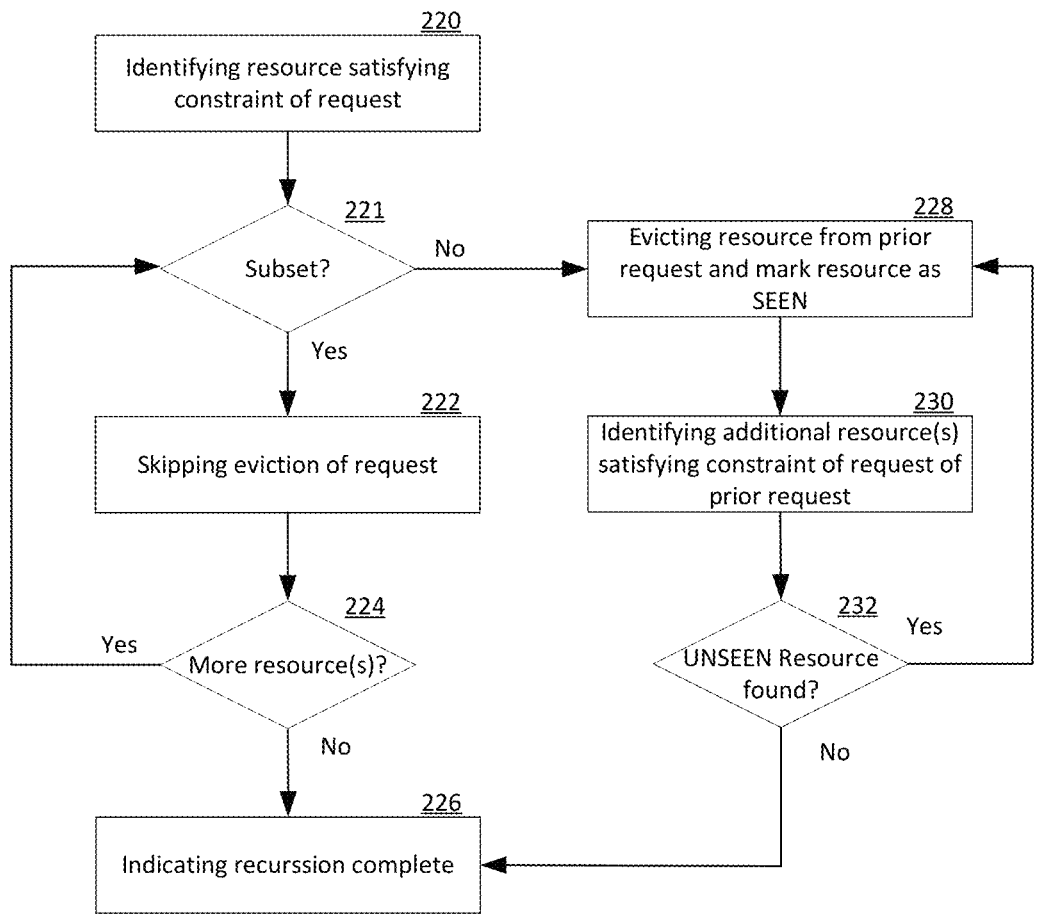
Figure 5B:
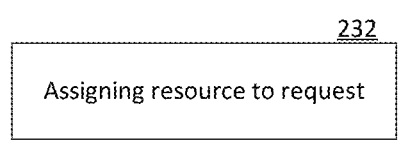

FIGS. 5A and 5B are flowcharts illustrating processes of resource allocation in accordance with embodiments of the disclosed technology. Though the processes are described below in the context of the distributed computing system 100 of FIG. 1, aspects of the processes can be implemented in computing systems with additional and/or different components.

As shown in FIG. 5A, a process 200 can include receiving a request for resources at stage 202. The request can include one or more constraints on physical attributes of the requested resources, such as number of cores, memory size, etc. The process 200 can then include enumerating resources in the distributed computing system at stage 204. In one implementation, both unallocated and allocated resources can be enumerated. In other implementations, unallocated resources can be enumerated separately from enumerating allocated resources. The process 200 can then include a decision stage 206 to determine whether an unallocated resource satisfies the one or more constraints of the received request. In response to determining that an unallocated resource satisfies the one or more constraints of the received request, the process 200 proceeds to allocating the unallocated resource to the received request and indicating resource allocation complete at stage 208. Otherwise, the process 200 proceeds to performing recursive assignment of allocated resources at stage 210. Examples operations of performing recursive assignment are described in more detail below with reference to FIG. 5B.

As shown in FIG. 5B, example operations of performing recursive assignment can include identifying a resource that satisfies the constraint of the received request at stage 220. The resource has been previously assigned to a prior request. The operations can then include a decision stage to determine whether the constraint of the prior request is a subset of the constraint of the received request. In response to determining that the constraint of the prior request is a subset of the constraint of the received request, the operations proceed to skipping eviction of the prior request from the identified resource at stage 222. The operations then proceed to another decision stage to determine whether any other resource(s) also satisfy the constraint of the received request. In response to determining that no other resource(s) also satisfy the constraint of the received request, the operations proceed to indicating recursion complete at stage 226. Otherwise, the operations revert to decision stage 221.

In response to determining that the constraint of the prior request is not a subset of the constraint of the received request, the operations proceed to tentatively evicting the prior request from the identified resource, tentatively assigning the identified resource to the received request, and marking the resource at being SEEN at stage 228. The operations can then include identifying additional resource(s) that satisfy constraint of the evicted prior request at stage 230. The operations can then include another decision stage 232 to determine whether any UNSEEN resource that satisfies the constraint of the prior request is found. In response to determining that no UNSEEN resource is found, the operations proceed to indicating recursion complete at stage 226. Otherwise, the operations revert to evicting another resource from another prior request at stage 228.

FIG. 6 is a computing device 300 suitable for certain components of the distributed computing system 100 in FIG. 1. For example, the computing device 300 can be suitable for the hosts 106, the client devices 102, or the resource allocator 104 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 7, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method for allocating computing resources to requests in a cloud computing system configured to provide the computing resources as computing services via a computer network, the method comprising:
    receiving, via the computer network, data representing a request for a computing resource of the cloud computing system, the request including a constraint on a physical attribute of the computing resource; and
    in response to receiving the request for the computing resource,
        enumerating one or more unallocated computing resources in the cloud computing system;
        determining whether at least one of the one or more unallocated computing resources satisfies the constraint on the physical attribute included in the received request for the computing resource;
    in response to determining that none of the one or more unallocated computing resources satisfy the constraint on the physical attribute included in the received request for the computing resource,
        enumerating allocated resources in the cloud computing system, the individual allocated resources being previously allocated to respective prior requests;
        identifying one of the allocated resources that satisfies the constraint on the physical attribute included in the received request for the computing resource;
        determining whether one of the enumerated allocated or unallocated resources satisfies a constraint on the physical attribute included in the request;
    in response to determining that one of the unallocated resources satisfies the constraint on the physical attribute included in the request,
        assigning the one of the unallocated resources to the request; and
        assigning, to the received request, the identified one of the allocated resources that satisfies the constraint on the physical attribute included in the received request for the computing resource; and
    in response to determining that none of the allocated or unallocated resources satisfies the constraint on the physical attribute included in the request,
        maintaining assignment of the identified one of the allocated resources to prior request and indicating that the cloud computing system does not include a computing resource that satisfies the constraint on the physical attribute included in the received request.

2. The method of claim 1, further comprising:
    in response to determining that at least one of the one or more unallocated computing resources satisfies the constraint on the physical attribute included in the received request for the computing resource,
    assigning the at least one of the one or more unallocated computing resources to the received request; and
    indicating a completion of an allocation operation for the received request.

3. The method of claim 1 wherein:
    the constraint on the physical attribute of the computing resource included in the received request includes a value, multiple values, or a range of values of the physical attribute of the computing resource; and
    determining whether at least one of the one or more unallocated computing resources satisfies the constraint on the physical attribute included in the received request for the computing resource includes determining whether at least one of the one or more unallocated computing resources has a physical attribute that satisfies the value, the multiple values, or the range of values of the physical attribute included in the received request for the computing resource.

4. The method of claim 1, further comprising:
upon identifying one of the allocated resources that satisfies the constraint on the physical attribute included in the received request for the computing resource, tentatively reallocating the identified one of the allocated resources from a corresponding prior request to the received request; and
in response to determining that none of the allocated or unallocated resources satisfies the constraint on the physical attribute included in the request, reversing reallocating the identified one of the allocated resources from a corresponding prior request.

5. The method of claim 1, further comprising:
upon identifying one of the allocated resources that satisfies the constraint on the physical attribute included in the received request for the computing resource, marking the identified one of the allocated resources as being SEEN; and
wherein determining whether one of the enumerated allocated or unallocated resources satisfies the constraint on the physical attribute included in the request includes skipping any of the enumerated allocated or unallocated resources marked as being SEEN.

6. The method of claim 1 wherein identifying one of the allocated resources that satisfies the constraint on the physical attribute included in the received request for the computing resource includes:
for each one of the allocated resources,
determining whether the constraint on the physical attribute of the one of the allocated resources is a subset of the constraint on the physical attribute of the computing resource included in the received request; and
in response to determining that the constraint on the physical attribute of the one of the requests corresponding to the one of the allocated resources is a subset of the constraint on the physical attribute of the computing resource included in the received request,
preventing assigning the one of the allocated resources to the received request.

7. The method of claim 1 wherein: the request is a first prior request; and the method further includes:
in response to determining that another one of the allocated resources corresponding to a second prior request satisfies the constraint on the physical attribute included in the first prior request,
determining whether another one of the enumerated allocated or unallocated resources satisfies a constraint on the physical attribute included in the second prior request; and
in response to determining that none of the allocated or unallocated resources satisfies the constraint on the physical attribute included in the second prior request, maintaining assignment of the identified one of the allocated resources to the first prior request and the identified another one of the allocated resources to the second prior request and indicating that the cloud computing system does not include a computing resource that satisfies the constraint on the physical attribute included in the received request.

8. The method of claim 1 wherein:
the request is a first prior request; and
the method further includes:
in response to determining that another one of the allocated resources corresponding to a second prior request satisfies the constraint on the physical attribute included in the first prior request,
determining whether one of the enumerated allocated or unallocated resources satisfies a constraint on the physical attribute included in the second prior request; and
in response to determining that another one of the unallocated resources satisfies the constraint on the physical attribute included in the second prior request,
reallocating the identified one of the allocated resources to the received request;
reallocating the another one of the allocated resources to the first prior request; and
allocating the another one of the unallocated resources to the second prior request.

9. A computing device in a cloud computing system configured to provide computing resources of the cloud computing system as computing services to users via a computer network, the computing resources including allocated and unallocated computing resources, wherein the computing device comprising:
a processor; and
a memory operatively coupled to the processor, the memory containing instructions executable by the processor to cause the computing device to:
upon receiving, via the computer network, data representing a request for a computing resource in a cloud computing system, the request including a constraint on a physical attribute of the computing resource,
determine whether at least one of the unallocated computing resources satisfies the constraint on the physical attribute included in the received request; in response to determining that none of the unallocated computing resources satisfy the constraint on the physical attribute included in the received request,
identify one of the allocated resources corresponding to a prior request that satisfies the constraint on the physical attribute included in the received request;
determine whether one of the allocated or unallocated resources satisfies a constraint on the physical attribute included in the request;
in response to determining that one of the unallocated resources satisfies the constraint on the physical attribute included in the request,
assigning the one of the unallocated resources to the request; and
assigning, to the received request, the identified one of the allocated resources that satisfies the constraint on the physical attribute included in the received request for the computing resource; and
in response to determining that none of the allocated or unallocated resources satisfies the constraint on the physical attribute included in the request,
maintain assignment of the identified one of the allocated resources to the request and indicate that the cloud computing system does not include a computing resource that satisfies the constraint on the physical attribute included in the received request.

10. The computing device of claim 9 wherein the memory includes additional instructions executable by the processor to cause the computing device to:
in response to determining that at least one of the one or more unallocated computing resources satisfies the constraint on the physical attribute included in the received request for the computing resource,
assign the at least one of the one or more unallocated computing resources to the received request; and indicate a completion of an allocation operation for the received request.

11. The computing device of claim 9 wherein the memory includes additional instructions executable by the processor to cause the computing device to:
upon identifying one of the allocated resources that satisfies the constraint on the physical attribute included in the received request for the computing resource, mark the identified one of the allocated resources as being SEEN; and
wherein to determine whether one of the enumerated allocated or unallocated resources satisfies the constraint on the physical attribute included in the request includes skip any of the enumerated allocated or unallocated resources marked as being SEEN.

12. The computing device of claim 9 wherein to identify one of the allocated resources that satisfies the constraint on the physical attribute included in the received request for the computing resource includes to:
for each one of the allocated resources,
determine whether the constraint on the physical attribute of the one of the allocated resources is a subset of the constraint on the physical attribute of the computing resource included in the received request; and
in response to determining that the constraint on the physical attribute of the one of the requests corresponding to the one of the allocated resources is a subset of the constraint on the physical attribute of the computing resource included in the received request,
prevent assigning the one of the allocated resources to the received request.

13. The computing device of claim 9 wherein to identify one of the allocated resources that satisfies the constraint on the physical attribute included in the received request for the computing resource includes to:
in response to determining that one of the unallocated resources satisfies the constraint on the physical attribute included in the request,
assign the one of the unallocated resources to the prior request; and
assign, to the received request, the identified one of the allocated resources that satisfies the constraint on the physical attribute included in the received request for the computing resource.

14. The computing device of claim 9 wherein:
the prior request is a first prior request; and
the memory includes additional instructions executable by the processor to cause the computing device to:
in response to determining that another one of the allocated resources corresponding to a second prior request satisfies the constraint on the physical attribute included in the first prior request,
determine whether another one of the enumerated allocated or unallocated resources satisfies a constraint on the physical attribute included in the second prior request; and
in response to determine that none of the allocated or unallocated resources satisfies the constraint on the physical attribute included in the second prior request,
maintain assignment of the identified one of the allocated resources to the first prior request and the identified another one of the allocated resources to the second prior request and indicate that the cloud computing system does not include a computing resource that satisfies the constraint on the physical attribute included in the received request.

15. The computing device of claim 9 wherein:
the request is a first prior request; and
the memory includes additional instructions executable by the processor to cause the computing device to:
in response to determining that another one of the allocated resources corresponding to a second prior request satisfies the constraint on the physical attribute included in the first prior request,
determine whether one of the enumerated allocated or unallocated resources satisfies a constraint on the physical attribute included in the second prior request; and
in response to determining that another one of the unallocated resources satisfies the constraint on the physical attribute included in the second prior request, reallocate the identified one of the allocated resources to the received request;
reallocate the another one of the allocated resources to the first prior request; and
allocate the another one of the unallocated resources to the second prior request.

16. A method for allocating computing resources to requests in a cloud computing system configured to provide the computing resources as computing services via a computer network, the method comprising:
receiving, via the computer network, data representing a request for a computing resource of the cloud computing system, the request including a constraint on a physical attribute of the computing resource; and
in response to receiving the request for the computing resource,
enumerating one or more unallocated computing resources in the cloud computing system;
determining whether at least one of the one or more unallocated computing resources satisfies the constraint on the physical attribute included in the received request for the computing resource;
in response to determining that none of the one or more unallocated computing resources satisfy the constraint on the physical attribute included in the received request for the computing resource,
enumerating allocated resources in the cloud computing system, the individual allocated resources being previously allocated to respective prior requests;
identifying one of the allocated resources that satisfies the constraint on the physical attribute included in the received request for the computing resource;
determining whether one of the enumerated allocated or unallocated resources satisfies a constraint on the physical attribute included in the request; and
in response to determining that none of the allocated or unallocated resources satisfies the constraint on the physical attribute included in the request,
maintaining assignment of the identified one of the allocated resources to the request and indicating that the cloud computing system does not include a computing resource that satisfies the constraint on the physical attribute included in the received request, wherein the request is a first prior request; and in response to determining that another one of the allocated resources corresponding to a second prior request satisfies the constraint on the physical attribute included in the first prior request, determining whether one of the enumerated allocated or unallocated resources satisfies a constraint on the physical attribute included in the second prior request; and in response to determining that another one of the unallocated resources satisfies the constraint on the physical attribute included in the second prior request, reallocating the identified one of the allocated resources to the received request;

reallocating the another one of the allocated resources to the first prior request; and allocating the another one of the unallocated resources to the second prior request.

17. The method of claim 16, further comprising:

in response to determining that at least one of the one or more unallocated computing resources satisfies the constraint on the physical attribute included in the received request for the computing resource, assigning the at least one of the one or more unallocated computing resources to the received request; and indicating a completion of an allocation operation for the received request.

18. The method of claim 16, wherein:

the constraint on the physical attribute of the computing resource included in the received request includes a value, multiple values, or a range of values of the physical attribute of the computing resource; and determining whether at least one of the one or more unallocated computing resources satisfies the constraint on the physical attribute included in the received request for the computing resource includes determining whether at least one of the one or more unallocated computing resources has a physical attribute that satisfies the value, the multiple values, or the range of values of the physical attribute included in the received request for the computing resource.

19. The method of claim 16, further comprising:

upon identifying one of the allocated resources that satisfies the constraint on the physical attribute included in the received request for the computing resource, tentatively reallocating the identified one of the allocated resources from a corresponding prior request to the received request; and in response to determining that none of the allocated or unallocated resources satisfies the constraint on the physical attribute included in the request, reversing reallocating the identified one of the allocated resources from a corresponding prior request.

20. The method of claim 16, further comprising:

upon identifying one of the allocated resources that satisfies the constraint on the physical attribute included in the received request for the computing resource, marking the identified one of the allocated resources as being SEEN; and wherein determining whether one of the enumerated allocated or unallocated resources satisfies the constraint on the physical attribute included in the request includes skipping any of the enumerated allocated or unallocated resources marked as being SEEN.

21. The method of claim 16, wherein identifying one of the allocated resources that satisfies the constraint on the physical attribute included in the received request for the computing resource includes:

for each one of the allocated resources, determining whether the constraint on the physical attribute of the one of the allocated resources is a subset of the constraint on the physical attribute of the computing resource included in the received request; and in response to determining that the constraint on the physical attribute of the one of the requests corresponding to the one of the allocated resources is a subset of the constraint on the physical attribute of the computing resource included in the received request, preventing assigning the one of the allocated resources to the received request.

22. The method of claim 16, further comprising:

in response to determining that one of the unallocated resources satisfies the constraint on the physical attribute included in the request, assigning the one of the unallocated resources to the request; and assigning, to the received request, the identified one of the allocated resources that satisfies the constraint on the physical attribute included in the received request for the computing resource.

23. The method of claim 16, wherein: the request is a first prior request; and the method further includes:

in response to determining that another one of the allocated resources corresponding to a second prior request satisfies the constraint on the physical attribute included in the first prior request, determining whether another one of the enumerated allocated or unallocated resources satisfies a constraint on the physical attribute included in the second prior request; and in response to determining that none of the allocated or unallocated resources satisfies the constraint on the physical attribute included in the second prior request, maintaining assignment of the identified one of the allocated resources to the first prior request and the identified another one of the allocated resources to the second prior request and indicating that the cloud computing system does not include a computing resource that satisfies the constraint on the physical attribute included in the received request.

24. A computing device in a cloud computing system configured to provide computing resources of the cloud computing system as computing services to users via a computer network, the computing resources including allocated and unallocated computing resources, wherein the computing device comprising:

a processor; and a memory operatively coupled to the processor, the memory containing instructions executable by the processor to cause the computing device to:

upon receiving, via the computer network, data representing a request for a computing resource in a cloud computing system, the request including a constraint on a physical attribute of the computing resource, determine whether at least one of the unallocated computing resources satisfies the constraint on the physical attribute included in the received request; in response to determining that none of the unallocated computing resources satisfy the constraint on the physical attribute included in the received request,
identify one of the allocated resources corresponding to a prior request that satisfies the constraint on the physical attribute included in the received request;
determine whether one of the allocated or unallocated resources satisfies a constraint on the physical attribute included in the request; and
in response to determining that none of the allocated or unallocated resources satisfies the constraint on the physical attribute included in the request,
maintain assignment of the identified one of the allocated resources to the request and indicate that the cloud computing system does not include a computing resource that satisfies the constraint on the physical attribute included in the received request,
wherein the request is a first prior request; and
in response to determining that another one of the allocated resources corresponding to a second prior request satisfies the constraint on the physical attribute included in the first prior request,
determining whether one of the enumerated allocated or unallocated resources satisfies a constraint on the physical attribute included in the second prior request; and
in response to determining that another one of the unallocated resources satisfies the constraint on the physical attribute included in the second prior request,
reallocating the identified one of the allocated resources to the received request;
reallocating the another one of the allocated resources to the first prior request; and allocating the another one of the unallocated resources to the second prior request.

25. The computing device of claim 24, wherein the memory includes additional instructions executable by the processor to cause the computing device to:
in response to determining that at least one of the one or more unallocated computing resources satisfies the constraint on the physical attribute included in the received request for the computing resource,
assign the at least one of the one or more unallocated computing resources to the received request; and indicate a completion of an allocation operation for the received request.

26. The computing device of claim 24, wherein the memory includes additional instructions executable by the processor to cause the computing device to:
upon identifying one of the allocated resources that satisfies the constraint on the physical attribute included in the received request for the computing resource, mark the identified one of the allocated resources as being SEEN; and
wherein to determine whether one of the enumerated allocated or unallocated resources satisfies the constraint on the physical attribute included in the request includes skip any of the enumerated allocated or unallocated resources marked as being SEEN.

27. The computing device of claim 24, wherein to identify one of the allocated resources that satisfies the constraint on the physical attribute included in the received request for the computing resource includes to:
for each one of the allocated resources,
determine whether the constraint on the physical attribute of the one of the allocated resources is a subset of the constraint on the physical attribute of the computing resource included in the received request; and
in response to determining that the constraint on the physical attribute of the one of the requests corresponding to the one of the allocated resources is a subset of the constraint on the physical attribute of the computing resource included in the received request, prevent assigning the one of the allocated resources to the received request.

28. The computing device of claim 24, wherein to identify one of the allocated resources that satisfies the constraint on the physical attribute included in the received request for the computing resource includes to:
in response to determining that one of the unallocated resources satisfies the constraint on the physical attribute included in the request,
assign the one of the unallocated resources to the request; and
assign, to the received request, the identified one of the allocated resources that satisfies the constraint on the physical attribute included in the received request for the computing resource.

29. The computing device of claim 24, wherein: the request is a first prior request; and the memory includes additional instructions executable by the processor to cause the computing device to:
in response to determining that another one of the allocated resources corresponding to a second prior request satisfies the constraint on the physical attribute included in the first prior request,
determine whether another one of the enumerated allocated or unallocated resources satisfies a constraint on the physical attribute included in the second prior request; and
in response to determine that none of the allocated or unallocated resources satisfies the constraint on the physical attribute included in the second prior request,
maintain assignment of the identified one of the allocated resources to the first prior request and the identified another one of the allocated resources to the second prior request and indicate that the cloud computing system does not include a computing resource that satisfies the constraint on the physical attribute included in the received request.

30. A method for allocating computing resources to requests in a cloud computing system configured to provide the computing resources as computing services via a computer network, the method comprising:
receiving, via the computer network, data representing a request for a computing resource in a cloud computing system, the request including a constraint on a physical attribute of the computing resource; and
in response to receiving the request for the computing resource,
enumerating unallocated computing resources in the cloud computing system;
determining whether at least one of unallocated computing resources satisfies the constraint on the physical attribute included in the received request for the computing resource;
in response to determining that none of the one or more unallocated computing resources satisfy the constraint on the physical attribute included in the received request for the computing resource,
identifying one of the allocated resources in the cloud computing system that satisfies the constraint on the physical attribute included in the received request for the computing resource, the identified one of the allocated resources corresponding to a prior request;

recursively determining whether one of the other allocated or unallocated resources in the cloud computing system that satisfies a constraint on the physical attribute included in the request;

in response to determining that one of the unallocated resources satisfies the constraint on the physical attribute included in the request, assigning the one of the unallocated resources to the request; and assigning, to the received request, the identified one of the allocated resources that satisfies the constraint on the physical attribute included in the received request for the computing resource; and in response to determining that none of the allocated or unallocated resources satisfies the constraint on the physical attribute included in the request, maintaining assignment of the identified one of the allocated resources to the request and indicating that the cloud computing system does not include a computing resource that satisfies the constraint on the physical attribute included in the received request.

31. The method of claim 30, wherein:
the request is a first prior request; and
the method further includes:
in response to determining that another one of the allocated resources corresponding to a second prior request satisfies the constraint on the physical attribute included in the first prior request,
determining whether another one of the enumerated allocated or unallocated resources satisfies a constraint on the physical attribute included in the second prior request; and
in response to determining that none of the allocated or unallocated resources satisfies the constraint on the physical attribute included in the second prior request,
maintaining assignment of the identified one of the allocated resources to the first prior request and the identified another one of the allocated resources to the second prior request and indicating that the cloud computing system does not include a computing resource that satisfies the constraint on the physical attribute included in the received request.

32. The method of claim 30, wherein:
the request is a first prior request; and
the method further includes:
in response to determining that another one of the allocated resources corresponding to a second prior request satisfies the constraint on the physical attribute included in the first prior request,
determining whether one of the enumerated allocated or unallocated resources satisfies a constraint on the physical attribute included in the second prior request; and
in response to determining that another one of the unallocated resources satisfies the constraint on the physical attribute included in the second prior request,
reallocating the identified one of the allocated resources to the received request; reallocating the another one of the allocated resources to the first prior request; and
allocating the another one of the unallocated resources to the second prior request.

33. A method for allocating computing resources to requests in a cloud computing system configured to provide the computing resources as computing services via a computer network, the method comprising:

receiving, via the computer network, data representing a request for a computing resource in a cloud computing system, the request including a constraint on a physical attribute of the computing resource; and in response to receiving the request for the computing resource, enumerating unallocated computing resources in the cloud computing system;

determining whether at least one of unallocated computing resources satisfies the constraint on the physical attribute included in the received request for the computing resource;

in response to determining that none of the one or more unallocated computing resources satisfy the constraint on the physical attribute included in the received request for the computing resource, identifying one of the allocated resources in the cloud computing system that satisfies the constraint on the physical attribute included in the received request for the computing resource, the identified one of the allocated resources corresponding to a prior request;

recursively determining whether one of the other allocated or unallocated resources in the cloud computing system that satisfies a constraint on the physical attribute included in the request; and in response to determining that none of the allocated or unallocated resources satisfies the constraint on the physical attribute included in the request, maintaining assignment of the identified one of the allocated resources to the request and indicating that the cloud computing system does not include a computing resource that satisfies the constraint on the physical attribute included in the received request, wherein the request is a first prior request; and in response to determining that another one of the allocated resources corresponding to a second prior request satisfies the constraint on the physical attribute included in the first prior request, determining whether one of the enumerated allocated or unallocated resources satisfies a constraint on the physical attribute included in the second prior request; and in response to determining that another one of the unallocated resources satisfies the constraint on the physical attribute included in the second prior request, reallocating the identified one of the allocated resources to the received request;

reallocating the another one of the allocated resources to the first prior request; and allocating the another one of the unallocated resources to the second prior request.

34. The method of claim 33, further comprising:
in response to determining that one of the unallocated resources satisfies the constraint on the physical attribute included in the request,
assigning the one of the unallocated resources to the request; and
assigning, to the received request, the identified one of the allocated resources that satisfies the constraint on the physical attribute included in the received request for the computing resource.

35. The method of claim 33, wherein: the request is a first prior request; and
the method further includes:
in response to determining that another one of the allocated resources corresponding to a second prior request satisfies the constraint on the physical attribute included in the first prior request, determining whether another one of the enumerated allocated or unallocated resources satisfies a constraint on the physical attribute included in the second prior request; and in response to determining that none of the allocated or unallocated resources satisfies the constraint on the physical attribute included in the second prior request, maintaining assignment of the identified one of the allocated resources to the first prior request and the identified another one of the allocated resources to the second prior request and indicating that the cloud computing system does not include a computing resource that satisfies the constraint on the physical attribute included in the received request.

\* \* \* \* \*